J. L. Baudelot,
Beer Cooler.
No. 3711. Reissued Nov. 2. 1869.
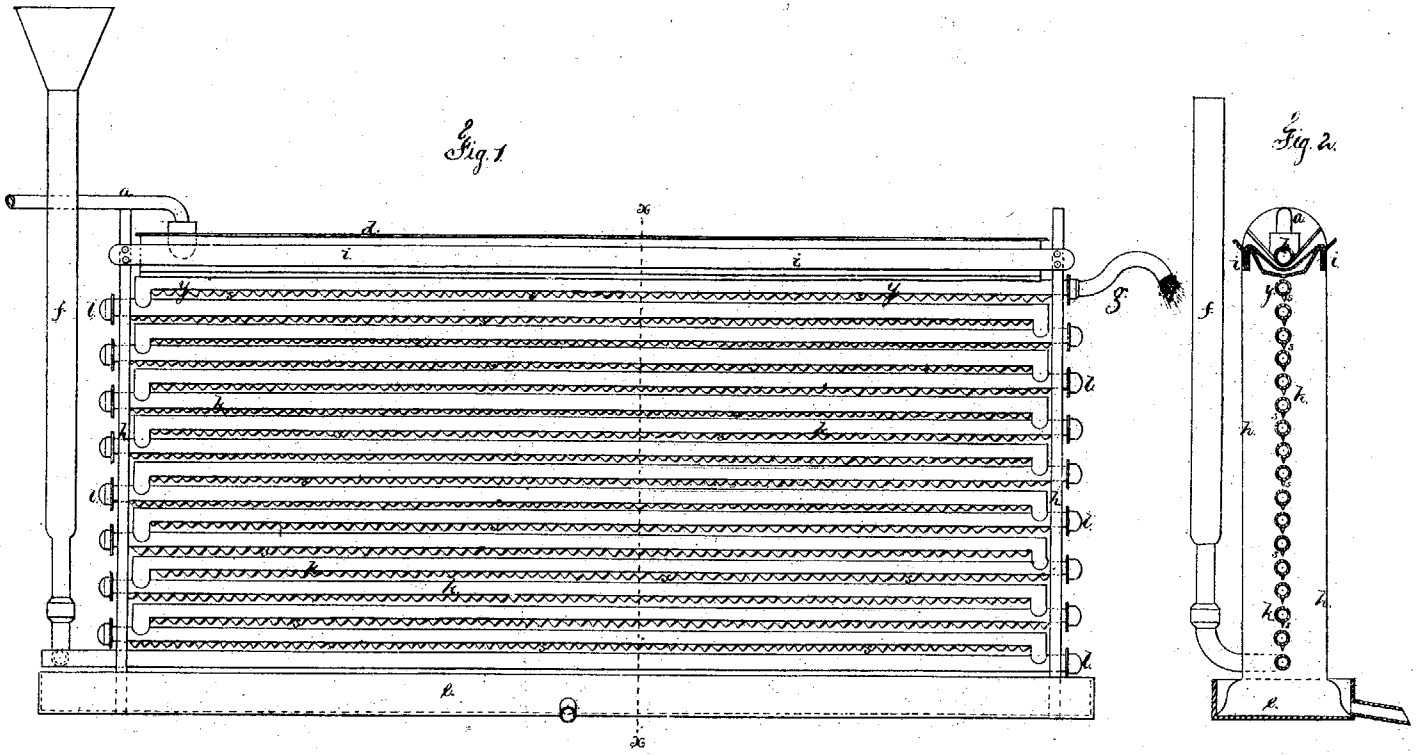
Geo. H. Pinckney.
Geo. H. Thurell
N. PETERS, PHOTO-LITHOGRAPHER, WASHINGTON, D. C.

United States Patent Office.

GEORGE B. TURRELL, OF NEW YORK, N. Y., ASSIGNEE, BY MESNE ASSIGNMENTS, OF JEAN LOUIS BAUDELOT.

*Letters Patent No.* 25,992, *dated November* 1, 1859; *antedated April* 13, 1856; *reissue No.* 1,267, *dated January* 28, 1862; *reissue No.* 3,711. *dated November* 2, 1869.

IMPROVED APPARATUS FOR COOLING BEER AND OTHER LIQUIDS.

The Schedule referred to in these Letters Patent and making part of the same.

*To all whom it may concern:*

Be it known that JEAN LOUIS BAUDELOT, of Harancourt, in the Empire of France, invented an Improved Apparatus for Cooling Beer and other Liquids; and the following is hereby declared to be a full, clear, and exact description of that portion of his said invention heretofore contained in the divided reissue, numbered 1,267, of the original patent, granted November 1, 1859.

This apparatus is adapted to the cooling of beer and other liquids with rapidity and uniformity.

The present portion of this invention relates to a vertical range of horizontal pipes, having downward projections, in combination with a trough, which distributes the liquids with uniformity to the top pipe of said range.

By this means the liquid to be cooled is caused to flow in a uniform film over the cooling-pipes, exposing the same to the action of the air, allowing vapors to pass off from the same, and the difficulties experienced in apparatus before constructed of this general character are avoided.

I remark that the tubes in the range of pipes must occupy a horizontal position, for if they are inclined, the liquid to be cooled will run toward one end, and the film become of unequal thickness.

If the downward projections are not used, the liquid will not be uniformly distributed, because the viscid nature of the beer causes it to accumulate in a mass before dropping. The adhesive and cohesive forces holding the beer to the under surface of the pipe until overcome by gravity, the beer descends in a mass unequally upon the next pipe below; whereas, by the downward projections, the film of beer that travels by adhesive force upon the exterior of the pipe, is spread by thin films or drops uniformly over the whole range.

Again, if the trough supplying the liquid to be cooled did not discharge the same with uniformity along the whole length upon the upper pipe of the range, the beer would not be uniformly distributed on the upper pipe, and hence could not be equally distributed on the other pipes of the series.

This present invention relates, therefore, to the cooling-apparatus formed by combining all of the foregoing requisites to a fully-successful cooler.

In the drawing—

Figure 1 is a side elevation of the said apparatus, and

Figure 2 is a vertical section at the line *x x*.

The beer or liquid to be cooled is supplied through a pipe, *a*, into the trough *d*.

The trough *d* is shown as containing a longitudinal distributing-pipe, *b*, perforated to equalize the distribution of the liquid, and beneath this a screen may be used to retain any foreign substance.

The inner tube or trough is formed so as to insure a uniform flow, throughout its entire length, of the liquid into the perforated trough below.

The perforations in the trough *d* are to be above the upper pipe *y*, in the vertical range of horizontal pipes *k k*, so that the liquid will fall with uniformity upon the upper surface thereof, and be conveyed to the next by the projections *s*.

These pipes *k k* are sustained by end-pieces *h h*, that also support the trough *d* by means of bars *i i*.

The cooling-liquid is supplied into a pipe, *f*, and passes into the lower pipe of the range *k*, and passes backward and forward as it rises, and finally escapes from the bent-up tube *g*, thus keeping all the cooling-tubes in the apparatus full of the cooling-liquid.

The liquid, cooled to the temperature, or nearly so, of the cooling-liquid, passes from the bottom pipe of the range to the receptacle *e*.

The tubes in the vertical range have projecting open ends, that are closed by removable caps or covers *l*.

These allow the tubes to be cleaned out in the inside, and should either tube become indented, the same may be straightened by a bar introduced in the inside, or the tubes may be inspected or repaired.

What is claimed as the invention of the said BAUDELOT, is—

1. A vertical range of horizontal tubes, in which the cooling-liquid is passed from the lower to the upper tubes, in combination with downward projections from said tubes, and an apparatus for supplying the liquid to be cooled with uniformity along the upper tube, substantially as and for the purposes set forth.

2. A vertical range of horizontal tubes, provided with downward projections, and sustained by the end-pieces or their equivalents, and an apparatus for distributing the liquid to be cooled, in combination with the caps *l*, made removable, as and for the purposes specified.

Dated October 7, 1869.

GEO. B. TURRELL.

Witnesses:
GEO. D. WALKER,
GEO. T. PINCKNEY.